Dec. 31, 1940.   J. R. ORELIND   2,226,575
DAMMING ATTACHMENT
Filed April 8, 1938   2 Sheets-Sheet 1

INVENTOR.
JOHN R. ORELIND
BY
ATTORNEY.

Dec. 31, 1940.  J. R. ORELIND  2,226,575
DAMMING ATTACHMENT
Filed April 8, 1938  2 Sheets-Sheet 2

INVENTOR.
JOHN R. ORELIND
BY
ATTORNEY.

Patented Dec. 31, 1940

2,226,575

UNITED STATES PATENT OFFICE 2,226,575

DAMMING ATTACHMENT

John R. Orelind, Canton, Ill., assignor to Minneapolis-Moline Power Implement Company, Minneapolis, Minn., a corporation of Delaware Application April 8, 1938, Serial No. 200,887

21 Claims. (Cl. 97—55)

This invention relates to improvements in damming attachments for lister or furrow forming plows.

The type of implement here in mind is that which is used for forming a furrow in the land and providing transversely extended dams at intervals in the furrow, to thereby define basins between the dams in which the water will be retained instead of running off along the furrow.

It is important that these dams be built up to an even height in the furrow in order that the water retaining basins will be well defined between the dams. It is also important that provisions be made for varying the frequency at which the dams occur in the furrow, even though the dams need not be evenly spaced. In other words, it should be possible to so regulate the damming attachment that the dams may be formed at intervals of a few feet or a few yards as the nature of the land, its contour and other considerations might dictate.

Having in mind these facts, it is the primary object of my invention to provide a damming attachment of an extremely simple and practical form wherein a single dam forming tool element is employed and is so supported and arranged that it will travel along the furrow and scrape up soil from the sides thereof to accumulate the said soil in the form of a dam across the furrow, which soil as it builds up to a predetermined level will engage means effective to initiate a rearward and upward motion of the tool element by which the element is permitted to ride over the soil leaving the dam in the furrow. Spring actuated means then return the tool element to scraping position again after the dam is cleared.

Another, and important, object of the present invention is to provide an attachment for this purpose in which the frame assembly is pivotally supported from the furrow forming implement and is yieldably urged downwardly to a predetermined and adjustable depth or level to thereby retain the tool carried by the frame assembly in scraping position in the furrow and to permit adjustment of the depth of the tool in the furrow with a consequent variation in the amount of earth scraped up by the tool. As a result, therefore, the tool may be caused to scrape up more or less earth in ratio to its forward travel in the furrow and, since the earth as it builds up effects the release of the tool, the frequency at which the dams occur along the furrow may thus be regulated simply by depth adjustment of the tool.

Still a further object of the invention is to provide an improved control means for the dam forming tool wherein spring retained toggle mechanism is employed to normally secure the tool in operative position, but in which means, operative by the height of the dam accumulated ahead of the tool, is provided to initiate a breaking or jackknifing action of the toggle such as will allow the tool to ride over and release the accumulated dam, after which operation the toggle mechanism will automatically restore the tool to working position to form the next dam.

The foregoing and other objects, together with means whereby they may be carried into effect, will best be understood from the following detailed specification, reference being had to the accompanying drawings wherein.

Figure 1:
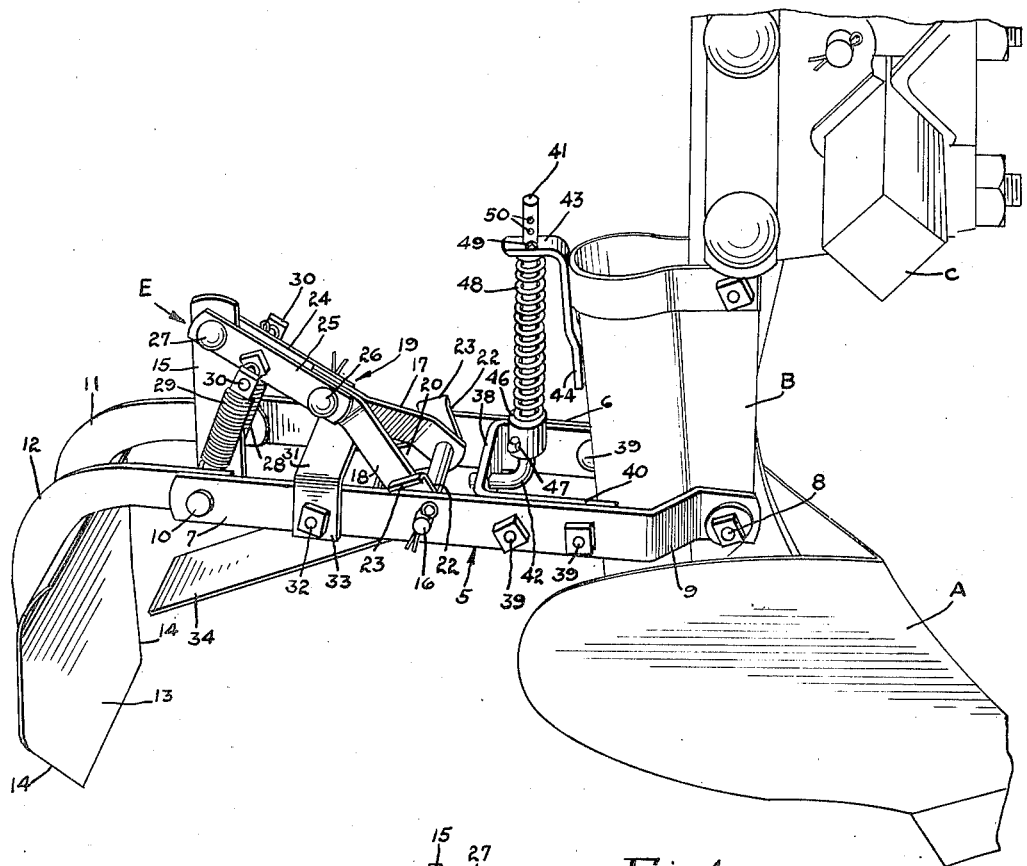
Fig. 1 is a perspective view of the damming attachment as mounted behind a lister plow bottom and its associated hitch.

It may be noted at this point that my invention as will be described herein is similar in purpose to that disclosed in my co-pending application, Serial Number 189,583, filed February 9, 1938, but the present invention provides features of construction and operation not found in my prior application.

Referring now more particularly and by reference characters to the drawings, A designates a lister plow bottom as secured to the hitch B and carried from the beam C of the plow. This assembly constitutes but a single row or single gang part of the complete implement and it has to be understood that my attachment to be described herein may be used upon each plow or gang of the implement. The plow bottom A is designed, of course, to form the furrow D in the land as it is drawn forwardly with the implement and my attachment, designated generally at E, is so arranged that it will follow the plow in the furrow formed thereby.

The damming attachment E accordingly comprises the draft or drag frame 5 made up of two side members or bars 6 and 7 which are pivotally mounted at their frontal ends upon a bolt 8 extended transversely through the foot of the hitch B. The side bars 6 and 7 then extend rearwardly from the hitch in a substantially horizontal position and are yieldably retained in this position by means to be described. The side bars 6 and 7 are further flared rearwardly and apart adjacent their frontal ends as indicated at 9 so that their major portions behind the plow will stand in spaced parallel position as shown.

Figure 4:
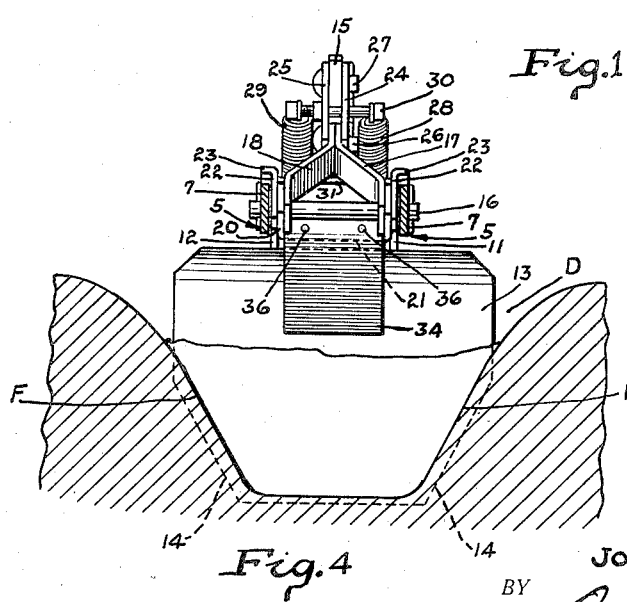
Fig. 4 is a vertical cross section along the line 4—4 in Fig. 2, showing the tool in position for forming a dam and with a quantity of soil as it is collected ahead of the tool in the process of forming the dam.

A hinge pin 10 is journaled transversely through the rear extremities of the side bars 6 and 7 and the frontal extremities of a pair of beams or tool mounting feet 11 and 12 are rigidly secured to this hinge rod to turn therewith. The dam forming tool 13 here takes the form of a substantially flat blade of relatively thin material secured, as by welding, to the rearwardly and downwardly turned ends of the beams 11 and 12 to be carried thereby. The tool 13 has the sloping sides 14 which adapt it to follow the furrow D in contact with the sides F thereof as shown in Figure 4. A tool actuating bar or standard 15 is secured to the hinge pin 10 and extends radially therefrom in an upward direction and the foregoing elements, the hinge pin 10, beams 11 and 12, tool 13 and this standard 15, all swing as a unit upon the pivotal connection formed by the pin with the side bars 6 and 7.

A pivot pin 16 is journaled transversely through the side bars 6 and 7 some distance forwardly of the hinge pin 10 and the frontal lever members 17 and 18 of a toggle lever assembly 19 are pivotally mounted on this pivot pin. These lever members 17 and 18 diverge forwardly to engage the pivot pin 15 adjacent the side bars 6 and 7 but to leave sufficient space to receive the ends of a wide U-shaped yoke 20 which are also pivoted on the pin. This yoke 20 has the transversely extending bight or cross member 21 extending parallel to, but some distance rearwardly of the pivot pin, and the ends of the yoke are formed with upward extensions 22 which terminate in outwardly turned stop lugs 23, the purpose of which will be presently described.

The rear or free extremities of the toggle lever members 17 and 18 are received between rear lever members 24 and 25 with a pivotal connection 26 formed therebetween and the rear extremities of these levers 24 and 25 in turn embrace the free or upper end of the standard 15 to which they are pivotally joined at 27. Retractile coil springs 28 and 29 are secured at their upper ends to a bolt 30 extending crosswise through the lever members 24 and 25 and at their lower ends are hooked over the hinge pin 10 to thereby exert a downward and rearward pull on the said lever members. The result of this spring tension is to straighten the toggle lever assembly 19, in which position it acts substantially as a forwardly extending brace between the pivot pin 16 and the upper end of the standard 15 to thereby prevent the standard from swinging forwardly, which action would, of course, result in an upward and rearward movement of the dam forming tool 13 on the hinge pin 10. The effect is thus to lock the tool 13 in such position that it hangs downwardly from the frame 5 in position to scrape along the furrow D as the plow moves forwardly over the field.

The straightening action of the toggle lever assembly is limited by means of a stop bar 31 which is secured by bolts 32 through its downwardly turned ends 33 to the frame side bars 6 and 7 and which extends transversely between the hinge and pivot pins 10 and 16 in such position that the frontal lever members 17 and 18 will rest upon the bar and be limited in their rearward and downward movement thereby. This position of the parts is shown in Figure 1. The stop bar 31 also serves as a stop in another cycle of the operation or another position of the parts as will presently appear.

A trip plate or pan 34 of flat rectangular form is arranged beneath the frame 5 at a point immediately ahead of the tool 13 and this plate is supported by a flange 35 turned upwardly at its frontal margin and secured flatly across the yoke 21 by bolts 36. The trip plate then extends rearwardly and inclines downwardly in a trailing position and in which position the upper margin of the yoke 21 will bear against the underside of the frontal lever members 17 and 18 as indicated at 37 in Fig. 1. The plate is prevented from falling below this position by the stop lugs 23 on the yoke which bear against the upper margins of the frame side bars 6 and 7 and limit the movement of the yoke, also as shown in Fig. 1.

A cross brace bar 38 of U-shaped form is mounted between the frontal ends of the frame side bars 6 and 7 by means of bolts 39 which pass through these bars and the legs 40 of the brace and support the brace bar transversely between the side bars a short distance rearwardly of the hitch B. A guide rod 41 is mounted by its angularly turned foot 42 through the brace bar 38 and extends upwardly therefrom slidably through the rearwardly turned and apertured ear 43 of a bracket 44 which is secured by screws 45 to the upper, rear portion of the hitch B. A spring tension adjustment collar 46 is placed over the guide rod 41 near its lower end and is secured in adjusted position thereon by means of a set screw 47 and an expansion spring 48 is coiled around the guide rod between this collar 46 and the ear 43 in such manner as to normally urge the frame 5 downwardly as will be readily evident. This movement is limited by a stop key 49 which is placed through any one of a series of diametrically extended holes 50 in the upper end of the guide rod 41 and which will contact the upper face of the bracket ear 43 as shown.

In operation the attachment is carried behind the plow bottom A above the furrow D formed thereby and with the tool 13 turned downwardly into the furrow in such manner that it will scrape up soil in the furrow as the implement travels forwardly. It may here be noted that the spring 48 exerts downward pressure on the attachment as a whole and to such extent that the tool 13 will maintain its desired level in the furrow. Also it will be noted that the key 49 will hold the tool at a constant level which may be varied by the location of the key through the desired hole 50. This adjustment of the frame to a selected level effects a corresponding adjustment of the position of the tool 13 in the furrow D. Thus, as the tool is lowered, it will scrape up a greater quantity of earth relative to its forward travel and the dams will thus occur with greater frequency. On the contrary, the elevation of the tool will cause it to move less earth and the dams will be spaced further apart. The adjustment of the tension of the spring 48 by the collar 46 plays an important part in this operation in that the spring tension may be readily adjusted to hold the frame 5 to the desired level no matter what this level may be.

Figure 2:
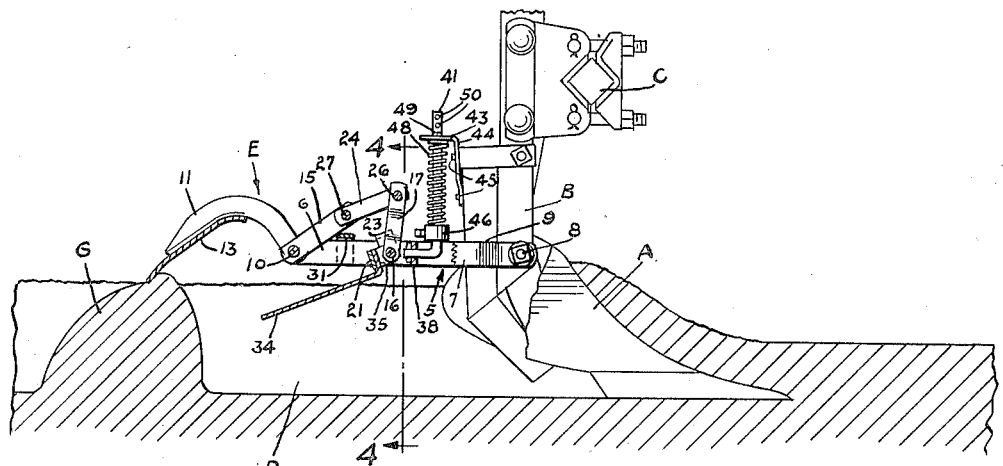
Fig. 2 is a side view of the assembly shown in Figure 1, this view being on a slightly reduced scale and showing the assembly in use in a furrow in the land, the dam forming tool further being shown as released from its operative position and swung upwardly to clear a dam in the furrow.
Figure 3:
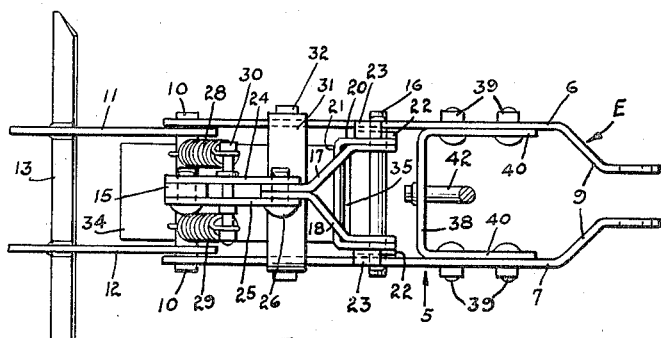
Fig. 3 is a top plan view of the damming attachment alone.

As the soil accumulates in the furrow D ahead of the tool 13, it finally reaches the trip plate 34 and, building up thereunder, urges the plate upwardly at its rear or free end. The result is an oscillatory movement of the yoke 21 forwardly and upwardly which causes it to correspondingly move the frontal lever members 17 and 18 and "break" the toggle lever assembly 19 or move the pivotal point 26 substantially (in an upward direction) out of alignment with the pivot pin 16 and pivot point 27. The rearward pressure of the accumulated soil on the tool 13 may now swing the tool rearwardly and upwardly, allowing it to drag or pull over the dam G formed by the soil (Figure 2) leaving the dam in the furrow as shown. This movement of the tool 13 jackknifes or collapses the toggle lever members 17—18 and 24—25 due to the forward movement of the standard 15 and this action is accomplished against the resistance of the springs 28 and 29. Consequently, when the rearward pressure on the tool 13 is relieved by its moving forwardly clear of the dam G, these springs reassert themselves and again straighten out the toggle lever assembly 19 to return the tool to working position whereat it scrapes up soil for the next dam. It will be noted in Figure 2 that the forward motion of the standard 15, as the tool 13 clears the dam, is limited by its engagement with the stop bar 31. This stop bar 31 thus prevents the standard 15 and rear lever members 24 and 25 from reaching an endwise or axially aligned position such as would cause them to lock and prevent the springs 28 and 29 from restoring the parts to operative or working positions.

The action of forming the dams and releasing or depositing them in the furrow after they have been built up to a sufficient height is entirely automatic as will be readily understood. It will be evident that the attachment thus formed and constructed is exceedingly simple and compact and, being wholly supported from the hitch B, it may be raised from the ground and carried by the hitch when the plow is elevated to transporting position.

It is understood that changes may be made in the structure and assembly herein specified, so long as such changes fall within the spirit and the scope of the appended claims.

Having thus fully disclosed my invention, what I claim as new and desire to secure by Letters Patent is:

1. In a damming device, an earth engaging tool movable into and out of earth-engaging position, a toggle lever assembly effective to normally support the tool in earth-engaging position, and means responsive to the accumulation of earth ahead of the tool to actuate said toggle lever assembly and initiate the movement of the tool out of earth-engaging position.

2. In a damming device, a dam forming tool movable into and out of earth-engaging position, a toggle assembly effective to support the tool in earth-engaging position, and mechanical means responsive to the accumulation of earth ahead of the tool for releasing the toggle assembly and initiating the movement of the tool out of earth-engaging position.

3. In a damming device, a dam forming tool movable into and out of earth-engaging position, a toggle lever assembly normally bracing the tool against movement out of earth-engaging position, and means responsive to accumulation of earth ahead of the tool to a predetermined height for initiating jackknifing motion of the toggle lever assembly to thereby release the tool from its earth-engaging position.

4. In a damming device, a dam forming tool movable into and out of earth-engaging position, a toggle lever assembly normally bracing the tool against movement out of its earth-engaging position, spring pressed means effective to yieldably retain the toggle lever assembly in this position, and mechanical means responsive to the height of the earth moved by the tool for disabling the toggle lever assembly and releasing the tool from earth-engaging position.

5. In a damming device, a dam forming tool movable into and out of earth-engaging position, a collapsible toggle lever mechanism effective in extended position to brace the tool against movement away from earth-engaging position, and mechanical means actuated by the height of the earth accumulated ahead of the tool for initiating the collapse of the toggle lever mechanism and thereby releasing the tool from earth-engaging position.

6. In a dam forming device, a tool movable into and out of working position, a collapsible toggle lever assembly effective in extended position to retain the tool in working position, mechanical means responsive to the accumulation of earth by the tool for initiating the collapse of the toggle lever assembly to thereby free the tool from working position, and spring pressed means operative to normally return the toggle lever assembly to extended position.

7. In a damming device, a dam forming tool movable into and out of working position, the said tool including a standard movable with the tool, toggle lever mechanism braced against the said standard and effective to normally prevent movement of the tool out of working position, and mechanical tripping means responsive to the height of a dam formed by the tool for disabling the toggle lever mechanism.

8. In a damming device, a dam forming tool movable into and out of working position, an actuating member extended from, and movable with, the tool, a collapsible toggle lever mechanism braced against the said actuating member and effective in extended position to retain the tool in working position, means responsive to and actuated by the height of a dam formed by the tool for initiating the collapse of the toggle lever mechanism, and spring pressed means normally retaining the toggle lever mechanism in extended position.

9. In a damming device, a dam forming tool movable into and out of working position, means for limiting the movement of the tool to such positions, toggle mechanism effective to normally retain the tool in working position, and trip means operative by the accumulation of earth by the tool and effective to disable the said toggle mechanism.

10. In a damming device, an earth-engaging tool adapted to operate in a furrow behind a furrow-forming implement to thereby accumulate soil in the form of a dam across the furrow, the said tool being normally supported in a depending position in the furrow and being movable rearwardly and upwardly for depositing the accumulated soil, mechanism normally bracing the tool against said rearward and upward movement, and means including a member pivotally supported at its forward end and disposed in a position to be actuated by the height of the soil accumulated in the furrow for disabling the bracing mechanism.

11. A damming attachment adapted to operate in a furrow behind a furrow-forming implement, the same comprising a frame supported by the implement and yieldably urged downwardly over the furrow, means for adjusting the working position of the frame with respect to the implement, an earth-engaging tool supported by the frame in scraping position in the furrow, the said tool being movable in the frame into and out of earth-engaging position, means operatively associated with the tool and effective to normally retain the tool in earth-engaging position in the furrow, and means operative by the accumulation of earth scraped up by the tool for disabling the tool retaining means and initiating the movement of the tool out of earth-engaging position.

12. A damming attachment adapted to operate in a furrow behind a furrow-forming implement, the same comprising a frame pivotally supported behind the implement over the furrow, adjustable means limiting the movement of the frame in a downward direction and yieldably retaining the frame in adjusted position, an earth-engaging tool movably mounted in the frame and movable into and out of earth-engaging position in the furrow, mechanism connected with the tool and normally effective to retain the tool in earth-engaging position, and mechanical means actuated by accumulation of earth by the tool for initiating the release of the retaining mechanism and freeing the tool from its earth-engaging position.

13. A damming attachment adapted to operate in a furrow behind a furrow-forming implement, the same comprising a frame pivotally supported behind the implement over the furrow, adjustable means limiting the movement of the frame in a downward direction and yieldably retaining the frame in adjusted position, an earth-engaging tool movably mounted in the frame and movable into and out of earth-engaging position in the furrow, mechanism connected with the tool and normally effective to retain the tool in earth-engaging position, mechanical trip means actuated by the height of earth accumulated by the tool in the furrow and effective to release the retaining mechanism and thereby free the tool from earth-engaging position, and spring pressed means operative to return the tool to earth-engaging position after said trip means is actuated.

14. A damming device for operation behind a plow and its support, the same comprising a frame pivoted to the support and extended rearwardly therefrom, a guide member extending upwardly from the frame, a bracket carried by the plow support and slidably receiving the said guide member, adjustable stop means carried by the guide member and operative to engage the bracket to thereby limit the downward movement of the frame upon the plow support, an earth-engaging tool movable in the frame into and out of earth-engaging position, and means actuated by the height of the earth accumulated by the tool for initiating the movement of the tool out of earth-engaging position.

15. A damming device for operation behind a plow and its support, the same comprising a frame pivotally connected to the plow support in a rearwardly trailing position, a guide member extended upwardly from the frame and slidably engaging the plow support, adjustable means for limiting the downward movement of the guide member to thereby support the frame at a predetermined height, yieldable means normally retaining the frame at predetermined position and effective to permit the frame to rise above that position, an earth-engaging tool movable in the frame into and out of earth-engaging position, and means actuated by earth accumulated in front of and by the tool for initiating the movement of the tool out of earth-engaging position.

16. A damming attachment for operation behind a furrow-forming plow and its support, the same comprising a frame supported on the plow support and vertically adjustable thereon, a dam forming tool carried by the frame and movable into and out of earth-engaging position, means responsive to the accumulation of earth by the tool and effective to initiate movement of the tool out of earth-engaging position, and means for adjusting the position of the frame to thereby vary the rate at which the earth is accumulated by the said tool.

17. A damming attachment adapted to operate in a furrow behind a furrow-forming implement, the same comprising a tool supported in scraping position in the furrow and movable into and out of scraping position, mechanical means responsive to the accumulation of earth by the tool for initiating the movement of the tool out of scraping position, and means for adjusting the position of the tool in the furrow and thereby varying the rate at which the earth is accumulated by the tool.

18. In combination, a scraping tool adapted to be propelled in an earth-engaging position for accumulating a pile of earth in front of the tool, said tool being movable out of earth-engaging position by the reaction of said accumulated earth against the tool as the latter moves forwardly, draft means therefor, means for holding said tool in earth-engaging position during the accumulation of said pile, and a gauge arm disposed in front of said tool and pivotally mounted on said draft means to gauge the height of said pile, for disabling said holding means.

19. In combination, a scraping tool adapted to be propelled in an earth-engaging position for accumulating a pile of earth in front of the tool, said tool being movable out of earth-engaging position to deposit said pile, supporting means for said tool, a gauge arm pivotally mounted on said supporting means in front of said tool for gauging the height of the pile, and means actuated by the pivotal movement of said arm, for controlling the movement of said tool out of earth-engaging position.

20. A damming device of the class described, comprising in combination, an earth-engaging blade adapted to collect earth during forward movement thereof and movable out of earth-engaging position to deposit the earth to form a dam, draft means therefor, a gauging arm pivotally mounted on said draft means ahead of said blade and extending rearwardly to a point directly ahead of said blade, said gauging arm being free to swing vertically to gauge the height of accumulated earth in front of said blade, and means actuated by said gauging means for controlling a movement of said blade out of earth-engaging position.

21. A damming device comprising in combination, a draft member, a scraper including at least one earth collecting blade swingably mounted on said member, detent means for preventing swinging movement of said scraper as the latter is moved with said blade in earth engaging relation, and control means comprising a gauge arm disposed in front of said tool and pivotally mounted on said draft member to swing upwardly as the height of the pile of collected earth increases, and means connecting said arm with said detent means for disabling the latter when said pile reaches a certain height, thereby allowing said scraper to swing upwardly whereby the collected earth is deposited to form a dam.

JOHN R. ORELIND.